US008147796B2

(12) United States Patent
Lu et al.

(10) Patent No.: US 8,147,796 B2
(45) Date of Patent: Apr. 3, 2012

(54) HYDROGEN STORAGE IN A COMBINED $M_xALH_6/M'_y(NH_2)_z$ SYSTEM AND METHODS OF MAKING AND USING THE SAME

(75) Inventors: Jun Lu, Salt Lake City, UT (US); Zhigang Zak Fang, Salt Lake City, UT (US); Hong Yong Sohn, Salt Lake City, UT (US)

(73) Assignee: University of Utah Research Foundation, Salt Lake City, UT (US)

( * ) Notice: Subject to any disclaimer, the term of this patent is extended or adjusted under 35 U.S.C. 154(b) by 477 days.

(21) Appl. No.: 12/282,831

(22) PCT Filed: Mar. 13, 2007

(86) PCT No.: PCT/US2007/006381
§ 371 (c)(1),
(2), (4) Date: May 5, 2009

(87) PCT Pub. No.: WO2007/106513
PCT Pub. Date: Sep. 20, 2007

(65) Prior Publication Data
US 2009/0311171 A1    Dec. 17, 2009

Related U.S. Application Data

(60) Provisional application No. 60/782,250, filed on Mar. 13, 2006.

(51) Int. Cl.
*C01B 6/04* (2006.01)
*C01B 6/00* (2006.01)
(52) U.S. Cl. .................. 423/646; 423/645; 423/647

(58) Field of Classification Search ............... 423/644, 423/645, 646, 647, 658.2
See application file for complete search history.

(56) References Cited

U.S. PATENT DOCUMENTS

| 6,106,801 A | 8/2000 | Bogdanovic et al. |
| 6,251,349 B1 * | 6/2001 | Zaluska et al. ............... 423/286 |
| 6,471,935 B2 | 10/2002 | Jensen et al. |

(Continued)

FOREIGN PATENT DOCUMENTS

WO    WO 97/03919    2/1997

OTHER PUBLICATIONS

P. Vajeeston et al., Structural Stability and Electronic Structure for Li3AlH6. 2004 The American Physical Society. Physical Review B 69, 020104(R) (2004). p. 020104-1 thru 020104-4.

(Continued)

*Primary Examiner* — Jerry Lorengo
*Assistant Examiner* — Noah Wiese
(74) *Attorney, Agent, or Firm* — Thorpe North & Western LLP

(57) ABSTRACT

As a promising clean fuel for vehicles, hydrogen can be used for propulsion, either directly or in fuel cells. Hydrogen storage compositions having high storage capacity, good dehydrogenation kinetics, and hydrogen release and uptake reactions which are reversible are disclosed and described. Generally a hydrogen storage composition of a metal aluminum hexahydride and a metal amide can be used. A combined system ($Li_3AlH_6/3LiNH_2$) with a very high inherent hydrogen capacity (7.3 wt %) can be carried out at moderate temperatures, and with approximately 95% of that inherent hydrogen storage capacity (7.0%) is reversible over repeated cycling of release and uptake.

25 Claims, 3 Drawing Sheets

U.S. PATENT DOCUMENTS

| | | | |
|---|---|---|---|
| 6,514,478 | B2 | 2/2003 | Zaluska et al. |
| 6,733,725 | B2 * | 5/2004 | Zaluska et al. ............... 420/528 |
| 6,814,782 | B2 * | 11/2004 | Bogdanovic et al. ........... 95/116 |
| 7,029,649 | B2 * | 4/2006 | Meisner et al. ............ 423/658.2 |
| 2003/0053948 | A1 | 3/2003 | Bogdanovic et al. |
| 2005/0047994 | A1 | 3/2005 | Meisner et al. |
| 2005/0191232 | A1 | 9/2005 | Vajo et al. |
| 2005/0191234 | A1 | 9/2005 | Mertens et al. |
| 2005/0191235 | A1 | 9/2005 | Vajo et al. |
| 2005/0191236 | A1 * | 9/2005 | Pinkerton et al. ......... 423/658.2 |
| 2006/1001376 | | 1/2006 | Vajo et al. |
| 2006/0051638 | A1 | 3/2006 | Gross |

OTHER PUBLICATIONS

Jun Lu et al., A new Li-Al-N-H System for Reversible Hydrogen Storage. J. Phys. Chem. B 2006, 110, pp. 14236-14239.

Jun Lu et al., Dehydration of a Combined LiAlH4/LiNH2 System. American Chemical Society. J Phys. Chem. B. 5 pages.

U.S. Department of Energy—Energy Efficiency and Renewable Energy Hydrogen, Fuel Cells and Infrastructure Technologies Program—Hydrogen Storage. HFCIT Hydrogen Storage: Metal Hydrides. http://www1.eere.energy.gov/hydrogenandfuelcells/storage/printable_versions/metal_hydrides.html. 2 pages. Content last updated Nov. 6, 2006.

U.S. Department of Energy—Energy Efficiency and Renewable Energy Hydrogen, Fuel Cells and Infrastructure Technologies Program—Hydrogen Storage. HFCIT Hydrogen Storage: Chemical Hydrogen Storage. http://www1.eere.energy.gov/hydrogenandfuelcells/storage/printable_versions/chem_storage.html. 3 pages. Content test updated Nov. 6, 2006.

* cited by examiner

HYDROGEN STORAGE IN A COMBINED $M_xALH_6/M'_y(NH_2)_z$ SYSTEM AND METHODS OF MAKING AND USING THE SAME

RELATED APPLICATIONS

This application claims the benefit of earlier filed U.S. Provisional Application No. 60/782,250, filed Mar. 13, 2006, which is incorporated herein by reference in its entirety.

GOVERNMENT INTEREST

The United States government has certain rights in this invention pursuant to U.S. Department of Energy, Office of Fossil Fuel Energy, contract number DE-FC36-05GO15069.

FIELD OF THE INVENTION

This invention relates to reversible hydrogen storage compositions, methods for reversibly storing hydrogen, and methods of making reversible hydrogen storage compositions.

BACKGROUND OF THE INVENTION

As a promising clean fuel for vehicles, hydrogen can be used for propulsion, either directly or in fuel cells. One limitation to using hydrogen as a propulsion fuel is discovering a suitable high capacity hydrogen-storage material that will make this source of energy economically viable. Although there have been numerous materials systems studied as potential candidates for hydrogen storage applications, none of the materials known to date have demonstrated sufficient hydrogen capacity or efficiency at commercially viable temperature ranges.

Following work on Ti-doped $NaAlH_4$, alkali- and alkaline-earth-metal-based complex aluminum hydrides, such as $MAlH_4$ (M=Li, Na, K), have been studied intensively as possible candidate materials for high-capacity reversible hydrogen storage. It has been generally found that alkali-based aluminum hydrides have great potential for storing hydrogen at moderate temperatures and pressures. Typically, the dehydrogenation of these complex hydrides follows the following 2-step reactions:

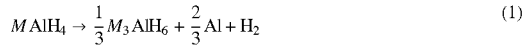

$$MAlH_4 \rightarrow \frac{1}{3}M_3AlH_6 + \frac{2}{3}Al + H_2 \quad (1)$$

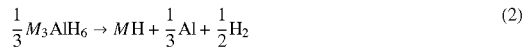

$$\frac{1}{3}M_3AlH_6 \rightarrow MH + \frac{1}{3}Al + \frac{1}{2}H_2 \quad (2)$$

Among them, lithium alanate ($LiAlH_4$), which was first synthesized in 1947 and is used as a powerful reducing agent in organic chemistry, is one of the materials having one of the highest inherent hydrogen storage capacities with a total hydrogen content of approximately 10.6 wt %.

During decomposition at elevated temperatures, $LiAlH_4$ first reduces to various intermediate compounds, including $Li_3AlH_6$, and then to LiH at about 160 to about 210° C., liberating 5.3 wt % and 2.6 wt % of hydrogen, respectively. The dehydrogenation of LiH, however, occurs at much higher temperatures, around 720° C., liberating another 2.6 wt % of hydrogen. This temperature is too high for commercial use, and hence the decomposition of LiH is not considered a viable dehydrogenation reaction for practical purposes. Without the decomposition of LiH, the maximum potential hydrogen storage capacity of $LiAlH_4$ decreases to 7.9 wt % for $LiAlH_4$. The difficulty of releasing $H_2$ from LiH limits the practical hydrogen capacity of $LiAlH_4$. A similar problem also exists with using the $NaAlH_4$ system as a hydrogen storage composition.

On the other hand, when lithium hydride is reacted with lithium amide ($LiNH_2$), hydrogenation and dehydrogenation are accomplished by the following two-step reversible reactions:

$$LiNH_2 + LiH \leftrightarrow Li_2NH + H_2 \quad (3)$$

$$Li_2NH + LiH \leftrightarrow Li_3N + H_2 \quad (4)$$

The dehydrogenation temperature is from about 200 to about 430° C., and the dehydrogenation reactions can release all of the available hydrogen from $LiNH_2$ and LiH. Reactions (3) and (4) indicate that the dehydrogenation temperature of LiH can be decreased dramatically when it is combined with $LiNH_2$. However, the reaction temperature of Reaction (4) is still too high for practical applications.

Considering all Reactions (1)-(4) collectively, the hydrogen in $LiAlH_4$ can be released by combining $LiAlH_4$ with $LiNH_2$. The overall reaction for the combined $LiAlH_4$ and $LiNH_2$ system can be given as:

$$LiAlH_4 + LiNH_2 \rightarrow Al + Li_2NH + 2.5H_2 \quad (5)$$

Thermogravimetric analysis (TGA) of $LiALH_4/LiNH_2$ mixtures without any catalysts indicated that a large amount of hydrogen (~8.1 wt %) is released from about 80° C. to about 320° C. under a heating rate of 2° C./min in three dehydrogenation reaction steps. The results also showed that the dehydrogenation temperature of the $LiAlH_4/LiNH_2$ system is lower than that of either Ti-doped $LiAlH_4$ or $LiNH_2/LiH$. The percent of hydrogen released from a $LiAlH_4/LiNH_2$ mixture is also higher than that from $LiAlH_4$ or $LiNH_2/LiH$. In effect, the compound $LiNH_2$ destabilizes $LiAlH_4$ by reacting with LiH during the dehydrogenation process of $LiAlH_4$.

However, in addition to the high inherent hydrogen storage capacity and good dehydrogenation kinetics, hydrogen release and uptake reactions should be reversible for a hydrogen storage material to be economically viable. Reaction (5) can be only partially reversed to the step of forming $Li_3AlH_6$. The reverse reaction from $Li_3AlH_6$ to $LiAlH_4$ seemed, however, not feasible. Therefore, reversible hydrogen storage compositions continue to be sought through ongoing research and development.

SUMMARY OF THE INVENTION

It has been recognized that it would be advantageous to develop a reversible hydrogen storage composition. In one aspect of the present invention, the reversible hydrogen storage composition includes a metal aluminum hydride compound having a molecular formula of $M_xAlH_6$ (where M includes an alkali metal or an alkaline earth metal) and a metal amide compound having a molecular formula of $M'_y(NH_2)_z$ (where M' includes an alkali metal or an alkaline earth metal). In one specific aspect of the invention, the reversible hydrogen storage composition can have a molar ratio between $M_xAlH_6$ and $M'_y(NH_2)_z$ of about 1:1 to about 1:4, and preferably about 1:3 or 1:1.5, depending on M and M'.

The present invention also includes a method for reversibly storing hydrogen including providing a reversible hydrogen storage composition having a metal aluminum hydride compound with a molecular formula of $M_xAlH_6$ and a metal amide compound with a molecular formula of $M'_y(NH_2)_z$. The reversible hydrogen storage composition can be heated to a temperature sufficient to form product hydrogen and a dehydrogenated composition from the reversible hydrogen storage composition.

The present invention also includes a method of making a reversible hydrogen storage composition by mixing a metal aluminum hydride compound and a metal amide compound, the metal aluminum hydride compound having a molecular formula of $M_xAlH_6$ and the metal amide compound having a molecular formula of $M'_y(NH_2)_z$.

Another aspect of the method for making a reversible hydrogen storage composition includes packaging the resulting reversible hydrogen storage composition for subsequent use in a fuel cell using standard methods and systems.

Additional features and advantages of the invention will be apparent from the following detailed description, which illustrates, by way of example, features of the invention.

DETAILED DESCRIPTION

Figure 1:
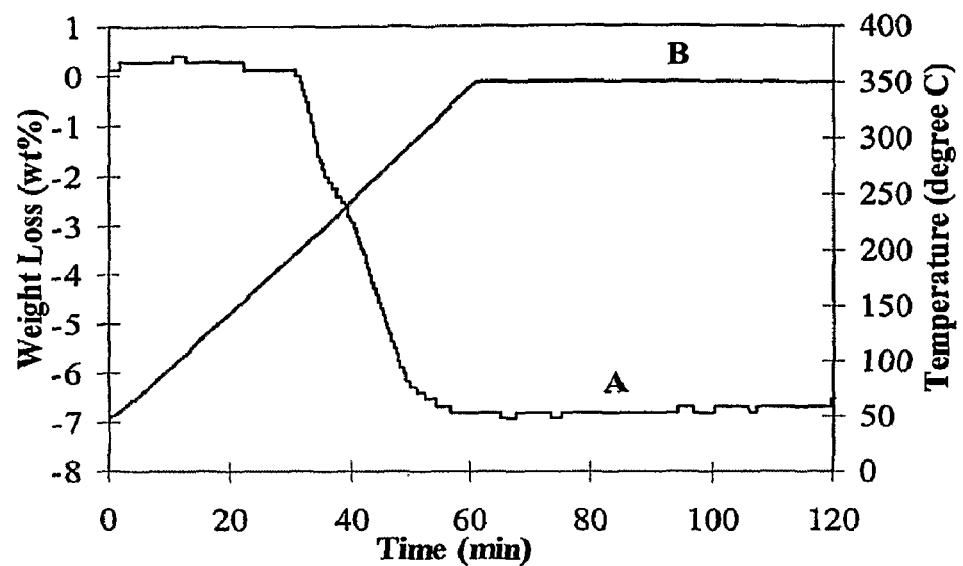
FIG. 1 shows the TGA result of the $Li_3AlH_6/3LiNH_2/4$ wt % $TiCl_3$ (Sample 1). The sample was run under argon atmosphere with a heating rate of 5° C./min. Curve A shows hydrogen generation, while Curve B shows the temperature profile.

Reference will now be made to exemplary embodiments, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

It must be noted that, as used in this specification and the appended claims, the singular forms "a," "an," and "the" include plural referents unless the context clearly dictates otherwise. Thus, for example, reference to "a lithium compound" includes one or more of such materials, reference to "an additive" includes reference to one or more of such additives, and reference to "a heating step" includes reference to one or more of such steps.

DEFINITIONS

In describing and claiming the present invention, the following terminology will be used in accordance with the definitions set forth below.

As used herein, "inherent hydrogen storage capacity" refers to the total weight percentage of a material that is hydrogen. This total weight includes hydrogen stored chemically as a hydrogen-containing compound and is not intended to include free hydrogen gas which may be trapped or adsorbed within the material.

As used herein, "react" or "reacting" refers to any interaction between the identified materials which results in an association of the identified materials. A reaction of materials can result in formation and/or destruction of chemical bonds, ionic association, or the like.

As used herein, "thermogravimetric analysis" or "TGA" is a technique for measurement of dehydrogenation properties.

As used herein, "X-ray diffraction analysis" or "XRD" is a technique in crystallography in which the pattern of X-rays diffracted through the closely spaced lattice of atoms in a crystal is recorded and then analyzed, potentially revealing the molecular structure of that lattice.

As used herein, "positive integer" refers to non-zero integers.

As used herein, "substantial" when used in reference to a quantity or amount of a material, or a specific characteristic thereof, refers to an amount that is sufficient to provide an effect that the material or characteristic was intended to provide. The exact degree of deviation allowable may in some cases depend on the specific context. Similarly, "substantially free of" or the like refers to the lack of an identified element or agent in a composition. Particularly, elements that are identified as being "substantially free of" are either completely absent from the composition, or are included only in amounts which are small enough so as to have no measurable effect on the composition.

As used herein, "about" refers to a degree of deviation based on experimental error typical for the particular property identified. The latitude provided the term "about" will depend on the specific context and particular property and can be readily discerned by those skilled in the art. The term "about" is not intended to either expand or limit the degree of equivalents which may otherwise be afforded a particular value. Further, unless otherwise stated, the term "about" shall expressly include "exactly," consistent with the discussion below regarding ranges and numerical data.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited.

As an illustration, a numerical range of "about 10 to about 50" should be interpreted to include not only the explicitly recited values of about 10 to about 50, but also include individual values and sub-ranges within the indicated range. Thus, included in this numerical range are individual values such as 20, 30, and 40 and sub-ranges such as from 10-30, from 20-40, and from 30-50, etc. This same principle applies to ranges reciting only one numerical value. Furthermore, such an interpretation should apply regardless of the breadth of the range or the characteristics being described.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

INVENTION

Hydrogen storage compositions of the present invention can be used to reversibly store hydrogen. Further, specific methods of forming these materials can be used in achieving the compositions of the present invention. In one aspect of the present invention, the reversible hydrogen storage composition can include a metal aluminum hydride compound having a molecular formula of $M_xAlH_6$ (where M includes an alkali metal or an alkaline earth metal) and a metal amide compound having a molecular formula of $M'_y(NH_2)_z$ (where M' includes an alkali metal or an alkaline earth metal). Thus, although other additives or materials may be present, the hydrogen storage compositions of the present invention can typically be predominantly, or in some embodiments consist essentially of, the hydride and amide materials.

The hydrogen storage compositions of the present invention can generally be simply mixtures of the hydride and amide starting materials. Most often this can be accomplished by mechanical milling, although any other suitable mixing technique may be applied. For example, the materials can be pelletized, compacted, or formed into a suitable form for incorporation into a reaction medium or vessel. These materials can be readily mixed as powders. Generally, a powder size of less than about 2000 μm and preferably less than about 500 μm can provide a good balance of surface area and cost. In another aspect, the powders of each material can have substantially the same average size. This can help improve homogeneous mixing and reduce localized variations in composition of the powder composition. In one specific aspect of the present invention, the metal aluminum hydride compound and the metal amide compound are in powder form.

Non-limiting examples of alkali metals and alkaline earth metals that can be used in the metal aluminum hydride compound and/or the metal amide compound include the following: lithium (Li), sodium (Na), potassium (K), beryllium (Be), magnesium (Mg), calcium (Ca), strontium (Sr), and combinations thereof. In one very specific aspect of the present invention, the metal used in the metal aluminum hydride can be lithium. In another specific aspect of the present invention, the metal used in the metal aluminum hydride can be sodium. Another application of the present invention requires a reversible hydrogen storage composition with a molar ratio between $M_xAlH_6$ and $M'_y(NH_2)_z$ of about 1:1 to about 1:4, and preferably about 1:3. Generally, any molar ratio which is near the stoichiometric ratio of 1:3 or 1:1.5 (depending on the metal M) can be suitable. For example, when M is Li and M' is Mg the preferred molar ratio is 1.1.5.

As an example, $Li_3AlH_6$ and $LiNH_2$ can be combined with molar ratios, as discussed above, to form LiH as an intermediate product of dehydrogenation of $Li_3AlH_6$. This LiH can react with $LiNH_2$ to release $H_2$ at a lower temperature than with lithium alanate based reactions. Thus, nearly all of the hydrogen contained in $Li_3AlH_6$ can be released. The overall reaction equation of a combined $Li_3AlH_6$ and $LiNH_2$ system is

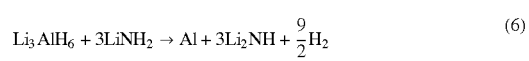

(6)

In accordance with the present invention, the above reaction is entirely, e.g. up to 100%, reversible. In the new combined system ($Li_3AlH_6/3LiNH_2$), which has a very high inherent hydrogen capacity, 9.8 wt %, of which, 7.3 wt % in theory can be released by reaction (6). The metal aluminum hydride of the reversible hydrogen storage composition can be prepared by reacting LiH with $LiAlH_4$ under ball mill. The metal imide can be prepared by decomposing $LiNH_2$ at a sufficient temperature in an inert atmosphere for a sufficient time to produce $Li_2NH$. These same basic reactions and principles apply substantially the same for alkali metals and alkaline earth metals other than lithium. However, lithium has the lowest molecular weight and thus would be generally preferred for mobile systems or other systems where weight is an important consideration.

In a specific application of the reversible hydrogen storage composition, a catalytic additive can be added to the reversible hydrogen storage composition. A non-limiting example of a specific catalytic additive that can be used with the present invention can comprise or consist essentially of titanium trichloride ($TiCl_3$), titanium tetrachloride ($TiCl_4$), titanium metal (Ti), and combinations thereof. Further, the catalytic additive can include additional materials such as, but not limited to, $AlCl_3$, $GaCl_3$, and combinations thereof.

The present invention also includes a method for reversibly storing hydrogen including providing a reversible hydrogen storage composition having a metal aluminum hydride compound with a molecular formula of $M_xAlH_6$ (M is an alkali metal or an alkaline earth metal) and a metal amide compound with a molecular formula of $M'_y(NH_2)_z$ (M' is an alkali metal or an alkaline earth metal). The reversible hydrogen storage composition can be heated to a temperature sufficient to form product hydrogen and a dehydrogenated composition from the reversible hydrogen storage composition. In one specific aspect of the method for reversibly storing hydrogen, the reversible hydrogen storage composition has a molar ratio as discussed previously. Suitable temperatures of the present invention can generally range from about 25° C. to about 400° C., often from about 100° C. to about 350° C., and preferably less than about 300° C.

In another aspect of the method for reversibly storing hydrogen, the temperature for heating the reversible hydrogen storage composition is from about 160 to about 350° C. In still another aspect of the present invention the method of reversibly storing hydrogen includes adding hydrogen gas to the dehydrogenated composition in an amount sufficient to regenerate at least part of the reversible hydrogen storage composition. The rehydrogenation can usually be accomplished by rehydrogenating the dehydrogenated material with high pressure hydrogen gas at a moderate temperature. A non-limiting example includes providing the storage hydrogen at a pressure from about 1000 to about 3000 psi, and in some cases from about 10 psi to about 5000 psi. As a general guideline, rehydrogenation can be performed at temperatures from about 100° C. to about 400° C., although about 200° C. to about 300° C. can be preferred. Another specific aspect of the invention includes a method of reversibly storing hydrogen where from about 6.0 wt % to about 7.3 wt % of the inherent hydrogen storage capacity is reversible.

The resulting hydrogen produced can be used for a wide variety of purposes, including but not limited to, industrial heating, chemical synthesis, or other fuels. In one currently preferred aspect, the product hydrogen can be used as a fuel for internal combustion engines. One advantage of the present invention is the relatively safe starting materials and a reduced potential for explosion which is characteristic of high pressure hydrogen storage.

Another aspect of the method for making a reversible hydrogen storage composition includes packaging the resulting reversible hydrogen storage composition for subsequent use in a fuel cell using standard methods and systems. For example, the composition can be filled into a modular container having a gas outlet and a hydrogen inlet for refilling/recharging. Over time, the materials can become contaminated, damaged or otherwise degraded such that replacement becomes necessary. Thus, a replaceable cartridge or other modular container can be operatively connected to a hydrogen based system.

EXAMPLES

The following examples illustrate various methods of preparing materials and performing reversible dehydrogenation and re-hydrogenation reactions in accordance with the present invention. However, it is to be understood that the following are only exemplary or illustrative of the application of the principles of the present invention. Numerous modifications and alternative compositions, methods, and systems can be devised by those skilled in the art without departing from the spirit and scope of the present invention. The appended claims are intended to cover such modifications and arrangements. Thus, while the present invention has been described above with particularity, the following Examples provide further detail in connection with several specific embodiments of the invention.

The starting materials, lithium aluminum hydride ($LiAlH_4$, 95%), lithium hydride (LiH, 95%), lithium amide ($LiNH_2$, 95%), Aluminum powder (Al, 99%) and $TiCl_3$-⅓$AlCl_3$, were purchased from Aldrich Chemical and used as received without any further purification. In one embodiment of the present invention, $Li_2NH$ was synthesized by decomposing commercial $LiNH_2$ at temperature above 450° C. in argon atmosphere for 6 hours. In another embodiment of the present invention, $Li_3AlH_6$ was synthesized by reacting LiH with $LiAlH_4$ under ball mill. In one embodiment of the present invention, $Li_3AlH_6$/$3LiNH_2$ were reacted by heating the mixture under argon atmosphere with a heating rate of 5° C./min. To prevent samples and raw materials from undergoing oxidation and/or hydroxide formation, they were stored and handled in an argon-filled glove box. Reactant mixtures were prepared using mechanical milling. Approximately 1.0 g mixtures were milled with a Spex 8000 mill under argon atmosphere. The milling time was varied from 1 to 3 hours. $TiCl_3$-⅓$AlCl_3$ was added as a catalyst for a rehydrogenation reaction.

The dehydrogenation properties of the mixture ($Li_3AlH_6$/$3LiNH_2$/4 wt % $TiCl_3$, sample 1) were determined by thermogravimetry analyzer (TGA) (Shimadzu TGA50) upon heating to 350° C. at a heating rate of 5° C./min. This equipment was placed inside the argon-filled glove box equipped with a regeneration system, which permitted simultaneously performing TGA without exposure of the sample to air. The hydrogenation properties of the mixture (Al/$3Li_2NH$/4 wt % $TiCl_3$, sample 2) were performed by using a custom-made autoclave, whose hydrogen pressure limit is up to 5000 psi, and temperature is programmed up to 500° C. Specifically, rehydrogenation was conducted by heating 500 mg of the above mixture to 300° C. at a heating rate of 5° C./min, and holding at 300° C. for 1-10 hours under 2000 psi of pressurized hydrogen. Cycle measurement of the sample 2 was performed by using the same procedures of rehydrogenation and dehydrogenation in multiple cycles. In this example, 6 cycles were run for the sample and analyzed using TGA.

The identification of reactants and reaction products in the mixture before and after thermogravimetric analysis was carried out using a Siemens D5000 model X-ray diffractometer with Ni-filtered Cu Kα radiation (λ=1.5406 Å). A scanning rate of 0.02°/s was applied to record the patterns in the 2θ range of 10° to 90°. In addition, it is noted that the amorphous-like background in the XRD patterns can be attributed to the thin plastic films that were used to cover the powders. A scanning electron microscope (SEM) was used to characterize the particle size and morphology of the sample after milling. SEM samples were prepared by attaching a small amount of the milled powder in a conductive tape in the glovebox.

FIG. 1 shows the TGA result of the $Li_3AlH_6$/$3LiNH_2$/4 wt % $TiCl_3$ (Sample 1). The sample was run under argon atmosphere with a heating rate of 5° C./min. Each reaction step is identified by the changes of the rate of the weight loss. It can be seen that a total 7.1 wt % of hydrogen was released within the examined temperature range. The dehydrogenation process appears to consist of two steps; the first steps are in the temperature range of 160 to 200° C. A total of 2.4 wt % of hydrogen was released within this step. This weight-loss step can best be described by the following reversible (up to 100% reversible) reaction:

$$Li_3AlH_6 \rightarrow 3LiH + Al + \frac{3}{2}H_2 \qquad (7)$$

The second step occurs at above 210° C. Another 4.7 wt % hydrogen was desorbed during the second step, which corresponds to the reaction (3). Thus, the overall reaction for the combined $Li_3AlH_6$ and $LiNH_2$ system can be described by the following reaction:

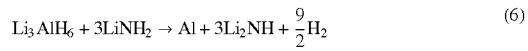

$$Li_3AlH_6 + 3LiNH_2 \rightarrow Al + 3Li_2NH + \frac{9}{2}H_2 \qquad (6)$$

Figure 2:
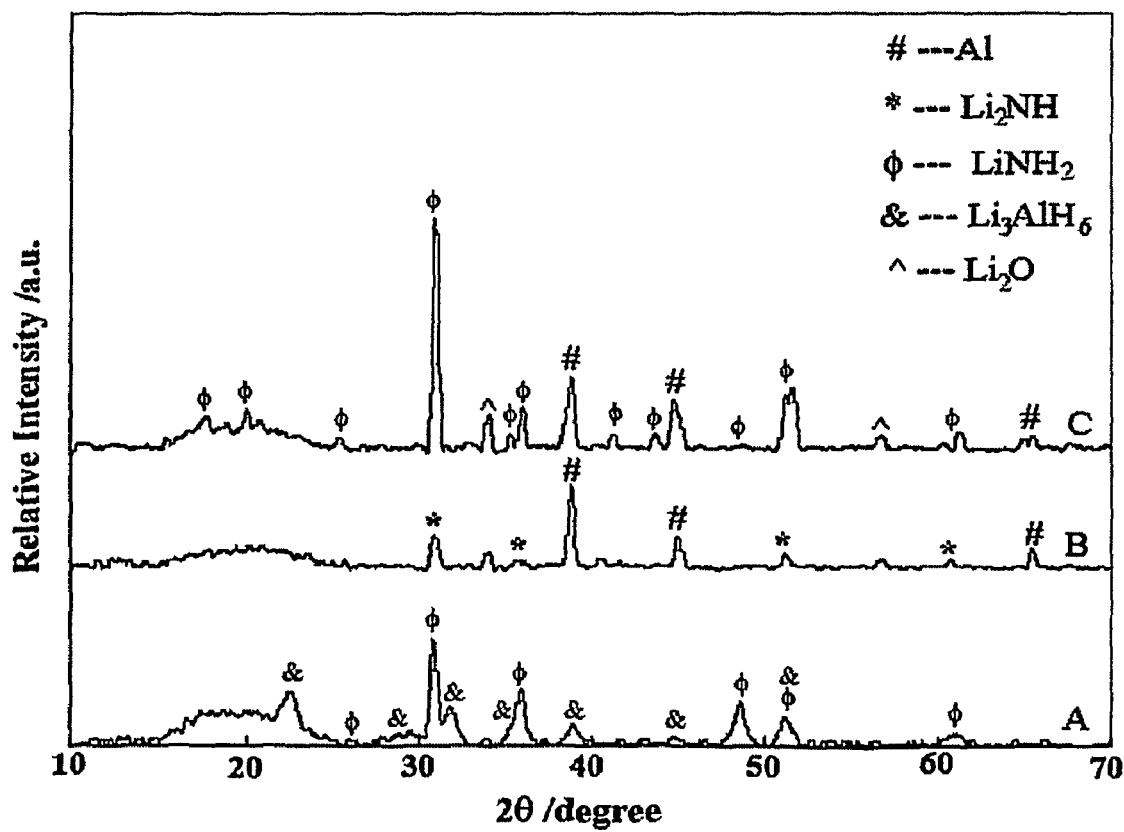
FIG. 2 confirms the overall dehydrogenation of $Li_3AlH_6/3LiNH_2/4$ wt % $TiCl_3$ (Sample 1) by identification of the final reaction products showing XRD patterns for A) sample 1 before hydrogenation; B) sample 1 after dehydrogenation; and C) sample 1 after heating to 200° C.

In order to verify these specific reaction steps, X-ray diffraction analysis was carried out on the raw materials as well as on the reaction products. FIG. 2 shows the XRD patterns of selected samples before and after dehydrogenation. Crystalline phases are identified by comparing the experimental data with JCPDS files from the International Center for Diffraction Data. In FIG. 2A, which shows the XRD pattern of Sample 1 before dehydrogenation, the peaks marked with "&" are attributed to the phase of $Li_3AlH_6$, and those marked with "φ" are attributed to the phase of tetragonal $LiNH_2$. No characteristic peaks of crystalline $TiCl_3$ are observed, which is possibly due to their low contents. FIG. 2B shows the XRD patterns of Samples 1 after dehydrogenation. The XRD patterns clearly show that $Li_3AlH_6$ and $LiNH_2$ are absent in the samples, indicating that they are consumed by the decomposition and some new compounds formed. In these figures, the peaks that are marked with asterisk are indexed to be the cubic phase of $Li_2NH$, and those marked with hashes are indexed to be Al or Al+LiH (Al and LiH peaks overlap on the XRD patterns.) However, these peaks could be only indexed to be Al phase if the reaction is complete, based on the reaction (3) and (7).

FIG. 2 confirms the overall dehydrogenation of R6 by identification of the final reaction products. However, it does not provide any information regarding the reaction path. In order to determine the reaction paths, i.e. the intermediate reactions, two approaches were taken. First, R3 and R7 are proposed as the intermediate reactions because the molar balance of these reactions matches with the weight loss reactions steps as indicated by TGA curve in FIG. 1. To further confirm each reaction step, the intermediate products after partial dehydrogenation at specific temperatures were analyzed using XRD. FIG. 2C shows the XRD pattern of the product after dehydrogenation at 200° C. for 30 minutes, in which the peaks that are marked with hashes are indexed to be cubic aluminum and LiH, and those marked with "φ" are indexed to be tetragonal $LiNH_2$. This confirms that the first dehydrogenation step corresponds to R7.

Rehydrogenation Properties of $Al/3Li_2NH/4$ wt % $TiCl_3$

Figure 3:
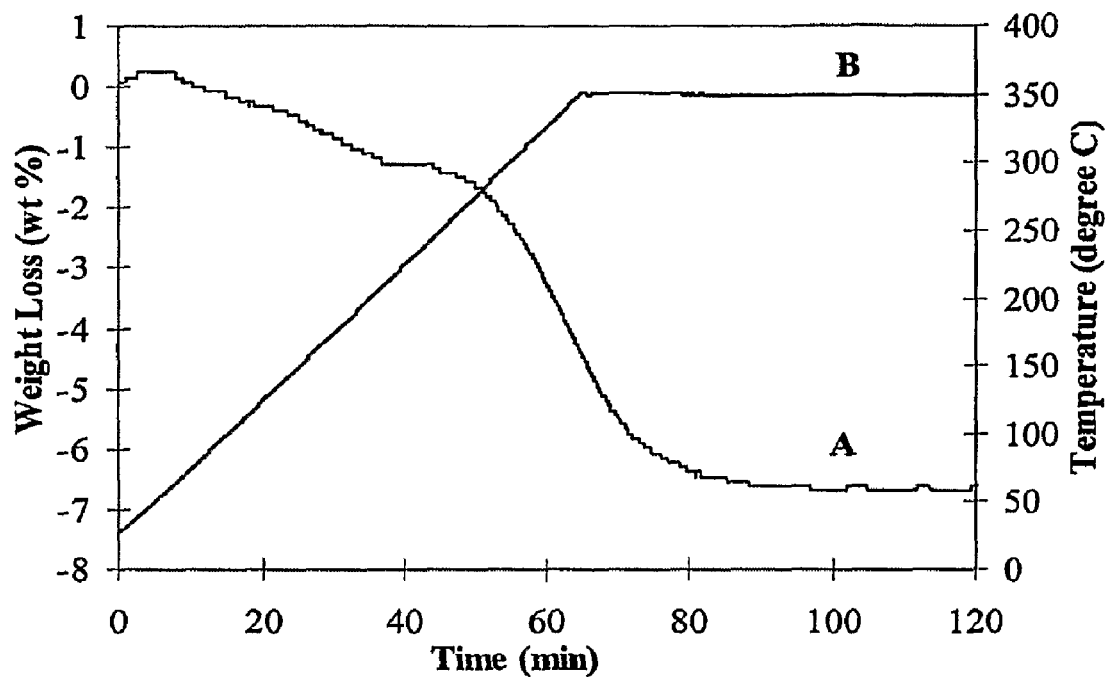
FIG. 3 shows TGA curves of the hydrogenated $Al/3Li_2NH/4$ wt % $TiCl_3$ (Sample 2). Curve A shows hydrogen generation under argon atmosphere and a heating rate of 5° C./min, while Curve B shows the temperature profile.
Figure 4:
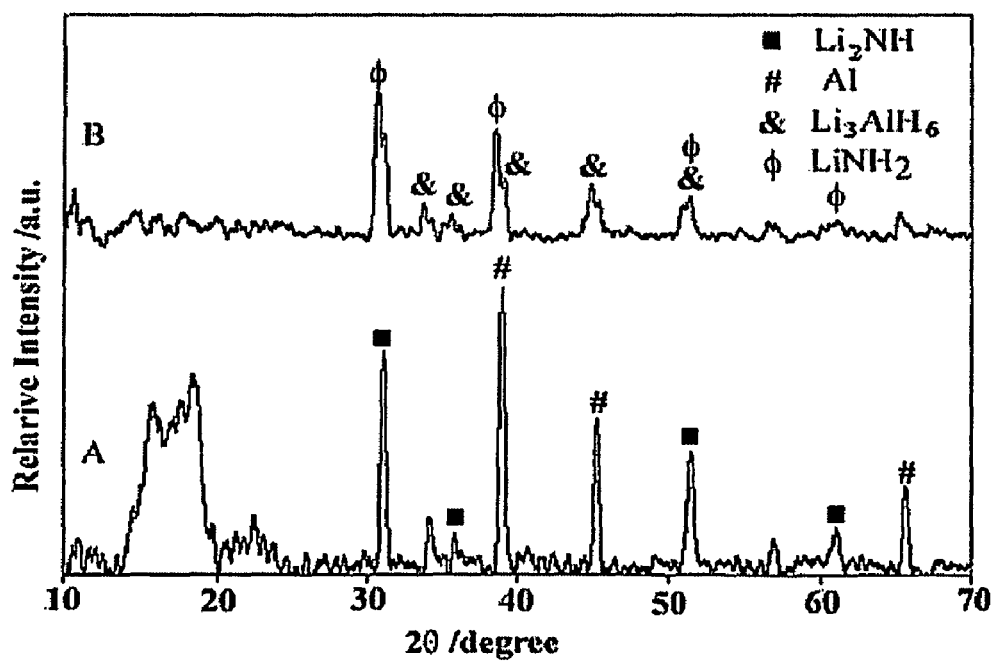
FIG. 4 shows the XRD pattern of Sample 2 before hydrogenation and after ball milling (A) and after hydrogenation (B).

Hydrogen adsorption properties of sample 2 ($Al/3Li_2NH/4$ wt % $TiCl_3$—the dehydrogenated products of sample 1), was determined by a custom-made autoclave and TGA. FIG. 3 shows TGA curves of the hydrogenated sample 2. After hydrogenation, sample 2 adsorbed about 7.0 wt % hydrogen under the condition of 2000 psi hydrogen pressure and 300° C. The TGA curve shows two dehydrogenation steps of the hydrogenated sample 2, which is very similar with the dehydrogenation curve of sample 1. So, we can conclude that the hydrogenation process for sample 2 is very complete. To further verify that, X-ray diffraction analysis was carried out on sample 2 before and after hydrogenation. In FIG. 4, line A, which shows the XRD pattern of Sample 2 before hydrogenation, the peaks marked with hashes are attributed to the phase of Al, and those marked with closed squares are attributed to the phase of $Li_2NH$. FIG. 4, line B shows the XRD patterns of Samples 2 after hydrogenation. The XRD patterns clearly show that Al and $Li_2NH$ are absent in the sample, indicating that they are consumed by reaction with hydrogen and some new compounds formed. In this figure, the peaks that are marked with '&" are indexed to be the cubic phase of $Li_3AlH_6$, and those marked with "φ" are indexed to be $LiNH_2$. No other phase was determined. So, XRD results clearly showed that sample 2 is complete hydrogenated.

Dehydrogen/Re-hydrogenation Cycle Properties of $Al/3Li_2NH/4$ wt % $TiCl_3$

Figure 5:
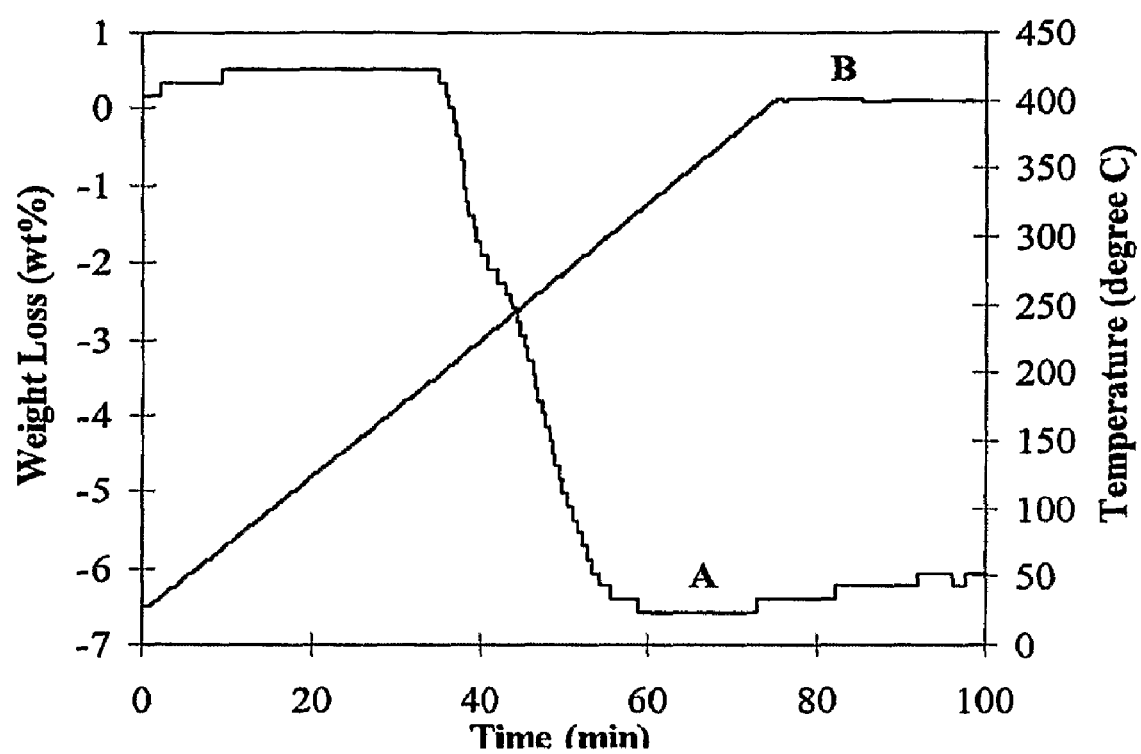
FIG. 5 TGA curves for sample 2 after 6 hydrogenation/dehydrogenation cycles. Curve A shows hydrogen generation under argon atmosphere and a heating rate of 5° C./min, while Curve B shows the temperature profile.

Hydrogenation and dehydrogenation cycle properties were measured using the same procedure as the hydrogenation of sample 2. FIG. 5 is the TGA curve of sample 2 after 6 adsorption/desorption cycles, which shows that there is still 6.9 wt % hydrogen that can be released from the sample. This experimentally verifies that the new material system can maintain its hydrogen storage capacity upon cycling of the dehydrogenation and rehydrogenation reactions.

Of course, it is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements. Thus, while the present invention has been described above with particularity and detail in connection with what is presently deemed to be the most practical and preferred embodiments of the invention, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. A reversible hydrogen storage composition comprising:
   a) a metal aluminum hydride compound having a molecular formula of $M_xAlH_6$ wherein M includes an alkali metal or an alkaline earth metal and wherein x is a positive integer; and
   b) a metal amide compound having a molecular formula of $M'_y(NH_2)_z$ wherein M' includes an alkali metal or an alkaline earth metal and wherein y and z are positive integers;
   wherein from about 4.0 wt % to about 9.0 wt % of the inherent hydrogen storage capacity is reversible.

2. The composition of claim 1, wherein M and M' are independently selected from the group consisting of lithium (Li), sodium (Na), potassium (K), beryllium (Be), magnesium (Mg), calcium (Ca), and combinations thereof.

3. The composition of claim 2, wherein M is lithium and x is 3.

4. The composition of claim 2, wherein M is sodium and x is 3.

5. The composition of claim 1, wherein the composition has a molar ratio between $M_xAlH_6$ and $M'_y(NH_2)_z$ of about 1:1 to about 1:4.

6. The composition of claim 5, wherein M is Li, M' is Li, and the molar ratio is about 1:3.0.

7. The composition of claim 5, wherein M is Li, M' is Mg, and the molar ratio is about 1:1.5.

8. The composition of claim 1, further comprising a catalytic additive.

9. The composition of claim 7, wherein the catalytic additive includes a titanium species.

10. A method for reversibly storing hydrogen, said method comprising:
    a) providing a reversible hydrogen storage composition including a metal aluminum hydride compound having a molecular formula of $M_xAlH_6$, wherein M includes an alkali metal or an alkaline earth metal and wherein x is a positive integer, and a metal amide compound having a molecular formula of $M'_y(NH_2)_z$ wherein M' includes an alkali metal or an alkaline earth metal and wherein y and z are positive integers; and
    b) heating the reversible hydrogen storage composition to a temperature sufficient to form product hydrogen and a dehydrogenated composition from the reversible hydrogen storage composition;
    wherein from about 4.0 wt % to about 9.0 wt % of the inherent hydrogen storage capacity is reversible.

11. The method of claim 10, wherein the reversible hydrogen storage composition has a molar ratio between $M_xAlH_6$ and $M'_y(NH_2)_z$ of about 1:1 to about 1:4.

12. The method of claim 11, wherein the molar ratio is about 1:3.0 or 1:1.5.

13. The method of claim 10, wherein the composition further comprises a catalytic additive.

14. The method of claim 12, wherein the catalytic additive is a titanium species.

15. The method of claim 10, wherein the temperature is from about 25 to about 350° C.

16. The method of claim 10, further comprising adding high pressure hydrogen gas to the dehydrogenated composition in an amount sufficient to regenerate at least part of the reversible hydrogen storage composition.

17. The method of claim 16, wherein the high pressure hydrogen gas is at a pressure from about 10 to about 5000 psi.

18. The method of claim 10, further comprising the step of using the product hydrogen as a fuel.

19. A method of making a reversible hydrogen storage composition comprising: mixing a metal aluminum hydride compound and a metal amide compound, said metal aluminum hydride compound having a molecular formula of $M_xAlH_6$, wherein M includes an alkali metal or an alkaline earth metal and wherein x is a positive integer and said metal amide compound having a molecular formula of $M'_y(NH_2)_z$ wherein M' includes an alkali metal or an alkaline earth metal and wherein y and z are positive integers, wherein from about 4.0 wt % to about 9.0 wt % of the inherent hydrogen storage capacity is reversible.

20. The method of claim 19, wherein the reversible hydrogen storage composition has a molar ratio between $M_xAlH_6$ and $M'_y(NH_2)_z$ of about 1:1 to about 1:4.

21. The method of claim 20, wherein the molar ratio is about 1:3.0 or 1:1.5.

22. The method of claim 19, further comprising packaging the reversible hydrogen storage composition for subsequent use in a fuel cell.

23. The method of claim 19, further comprising preparing the metal aluminum hydride by reacting LiH with $LiAlH_4$ under ball mill.

24. The method of claim 19, wherein the composition further comprises a catalytic additive.

25. The method of claim 24, wherein the catalytic additive is a titanium species.

* * * * *